United States Patent Office 3,594,192
Patented July 20, 1971

3,594,192
PROCESS FOR MAKING SOY PROTEIN MORE HEAT COAGULABLE IN COMBINATION WITH EGG WHITE AND COMPOSITIONS CONTAINING SAME
Joseph D. Mullen, Golden Valley, Donald E. Smith, Minneapolis, and Alide Ogrins, St. Paul, Minn., assignors to General Mills, Inc.
No Drawing. Filed Nov. 29, 1967, Ser. No. 686,726
Int. Cl. A23j 3/02
U.S. Cl. 99—114    16 Claims

ABSTRACT OF THE DISCLOSURE

Aqueous dispersions of soy protein material are modified by raising the pH to over about 9.0 and then reducing the pH to about 5.5 to 8.0. The modified products are used to replace a portion of the egg white in foods whose structures depend at least in part on the heat coagulation properties of egg white.

---

The present invention relates to a process of treating soy protein to render the same more heat coagulable when used in combination with egg white. It also relates to compositions comprising the modified soy protein and egg white and to the preparation of food products utilizing such compositions.

Egg white is a valuable constituent of many foods due primarily to its nutritional qualities and to the fact that it can be whipped or aerated to produce foams and/or heat coagulated to yield relatively rigid matrixes which serve as the supporting structures for a variety of foods. In some cases, such as in the production of angel food cakes using conventional or traditional mixing procedures, the egg white is used for both of these properties—aeration and heat coagulation. In other cases, the egg white is used mainly or solely for only one of its functions. In this respect, it is used in the production of layer cakes, meat loaves, vegetable protein meat analogs, and the like primarily for its heat coagulable properties wherein it serves to bind the other constituents of such foods into a matrix which is capable of holding its shape under normal conditions.

While egg white is commonly used for the purposes set forth and others and is normally readily available to housewives and food manufacturers, it is subject to seasonal variations in cost and availability and is often the most, or one of the most, expensive ingredients of the food being prepared. Thus it would be highly desirable to find a replacement in whole or part for egg white.

Soy protein is also a readily available commodity and extensive research has been carried out in an effort to make use of same in foods because of the high nutritional value thereof. Much of this research has been directed at the production of isolates or other concentrates which are bland. In this respect soy protein is often characterized by a flavor and/or odor which a certain portion of the populace finds objectionable. It has also been proposed to modify soy protein to improve its functional properties when used in various foods. One example of this is the use of acid or acid with enzyme hydrolysis to reduce the molecular weight of the soy proteins. The resulting products are current articles of commerce and find use as aerating agents for confections and related foods as described on page 978 of Markley's book "Soybeans and Soybean Products," vol. II, 1951, Academic Press, Inc. This modification renders the soy proteins non-heat coagulable or does not improve the gel forming ability of the same. Thus such modified soy protein products or soy albumins find utility in food applications as egg white substitutes where aeration, but not heat coagulation, is the key property needed.

In recent years, a considerable research effort has been directed at the production of products which resemble natural meats. One of the main avenues for producing these meat analogs is to first prepare fibers from edible proteins and then add suitable flavoring agents, colorants, binders and the like to the fibers and heat set the resulting products. To date, and to the best of our knowledge, the only really suitable binder has been egg white. As such, it performs a variety of functions when heat coagulated. Thus it tends to bind the multiplicity of fibers together perhaps through some type of coaction with the fibers, aids in binding water in the product, and contributes elasticity to the meat analog. It is bland and also works well in the impregnating fluid or serum containing the other ingredients added to the fibers. It is not perfect, however, since the quality varies from batch to batch, often gives the analog a mottled appearance, sometimes causes toughness and is also subject to bacteriological deterioration.

It is an object of our invention to provide a process of treating soy protein to render the same more heat coagulable when used in combination with egg white. A further object of the invention is to provide heat coagulable compositions comprising egg white and the modified soy protein product. Another object of the invention is to provide a process of preparing foods wherein the egg white content is reduced by the use of the modified soy protein product. Still another object of the invention is to provide foods wherein a composition comprising egg white and the modified soy protein product is utilized. These and other objects will become apparent from the following detailed description.

We have now discovered that soy protein can be rendered more heat coagulable when used in combination with egg white by raising the pH of an aqueous dispersion thereof to above about 9.0 with an alkaline material and then reducing the pH to between 5.5 and 8.0. The resulting modified soy protein product finds use as a replacement for up to about ¾ of the egg white needed to provide the structures or matrixes of a variety of foods wherein the egg white functions primarily through its property of being heat coagulable.

The starting material can be a soy isolate or concentrate containing at least about 70% by weight protein. Such materials can be obtained by removing at least a part of the non-protein constituents of defatted soy flour, meal or flakes by various means. Isolates normally contain over 90% by weight protein and are preferred materials in our process. Such isolates can preferably be obtained by alkaline extraction and acid precipitation using conventional techniques. For example, they can be prepared by the extraction of defatted soybean flakes or similar sources material with dilute aqueous solutions of sodium hydroxide with subsequent precipitation of the extracted protein with an acid at the isoelectric region (pH 4.1 to 4.6). Representative acids are hydrochloric acid, sulfuric acid and sulfurous acids. It is to be noted that the improvement achieved by the use of our process varies somewhat depending on the precise method used in preparing the starting soy isolate or concentrate and especially as to the acid used in the precipitation step. Thus, for example, sulfurous acid precipitated soy protein can be treated in accordance with our invention with less alkali than is required to treat hydrochloric acid precipitated soy protein to obtain optimum heat coagulation properties or gel strengths.

Any of a variety of water soluble alkaline materials can be used to raise the pH of the soy protein material to the indicated degree. Preferred materials are the inorganic bases and salts such as trisodium phosphate ($Na_3PO_4$) and the alkali metal hydroxides, especially sodium hydroxide, and ammonia or ammonium hydroxide.

The temperature at which the alkaline treatment is carried out and the length of time of holding the soy protein in the alkaline state are not critical except that optimum results are obtained at certain temperatures and treating times for any particular soy isolate or concentrate at designated concentrations in the aqueous dispersions and at various alkaline material levels of usage and particular agent employed. Temperatures of from about 25 to 85° C. are preferred when treating an aqueous dispersion containing about 5 to 20% by weight soy protein with sodium hydroxide at a soy protein solids to sodium hydroxide weight ratio of between about 8 to 1 and 20 to 1. Under these conditions, it is preferred to carry out the alkaline treatment for from about 2 minutes to 1 hour. It is especially preferred to treat soy isolate containing 90% by weight or above protein at the designated concentrations in the aqueous dispersion at temperatures of about 25 to 40° C. for about 2 to 12 minutes with the ratio of soy protein solids to sodium hydroxide being in the range of between about 8 to 1 and 14 to 1. When ammonia gas is used as the alkaline agent, it is preferred to carry out the alkaline treatment for about 15 minutes to 2 hours at temperatures of about 25 to 85° C. on aqueous dispersions containing about 5 to 25% by weight soy protein. The ammonia gas is bubbled through the dispersion for the indicated times and then, if desired, the resulting alkaline solution can be held for about 1 to 48 hours after the completion of the sparging and prior to reducing the pH of the solution.

When ammonia gas or ammonium hydroxide are used as the alkaline agents, the pH of the resulting solution can be reduced to near neutral simply by drying the said solution. However, the pH of such alkaline solutions and also those wherein other alkaline agents are used—i.e. sodium hydroxide, trisodium phosphate, etc.—can also be reduced by the addition of an acid which is preferably an edible inorganic or organic acid. Representative of these acids are phosphoric acid, hydrochloric acid, citric acid, lactic acid and the like. During such neutralization or reduction of the pH, it is desirable that the soy protein solution is stirred in order to disperse any beads of precipitated protein that form as the acid is added. In any case, the pH of the solution is reduced to about 5.5 to 8.0 and preferably to about 7.0. At the near neutral point, the modified soy protein having improved gelling or heat coagulation properties can be used in combination with egg white in a variety of foods without effecting the alkaline or acidic nature of such foods.

The modified soy protein in the described aqueous solution can be used as such or can be dried prior to use in combination with the egg white. The gel strength is sometimes reduced by drying but such reduction can be partially or completely alleviated by adding a small amount of a phosphate salt, preferably sodium tripolyphosphate ($Na_5P_3O_{10}$) to the solution prior to the drying step. Any method of drying can be used although with the ammonia or ammonium hydroxide treated soy protein, it is preferred to use lyophilization or spray drying.

Other additives can be added during or after the alkaline processing to perform various functions. Thus $H_2O_2$ can be added to product a lighter colored product. The addition of small amounts of $Al_2(SO_4)_3$ and $CaCl_2$ often increases the gel strength of the modified product somewhat. We have also found that small amounts of sodium citrate tend to increase the shear strength of gels prepared from the egg white-modified soy protein compositions.

While we do not fully understand the physical-chemical changes in the soy protein due to the treatment according to our invention, it is apparent that they are quite complex and depend to a certain extent on the specific modification conditions. In general, ultracentrifuge comparison in a phosphate buffer at pH 7.6 of unmodified soy isolate and soy isolate treated according to the present invention shows that the modification results in a marked conversion of those native components having sedimentation coefficients of 7 and 11 Svedberg units, to significantly slower sedimenting components. A small amount of aggregated components with sedimentation coefficients of about 15 Svedberg units are also present in the modified soy protein. It appears that during the alkaline treatment most of the 7 and 11 S components in about the 300,000 molecular weight range are broken down to subunits. This is believed due to electrostatic repulsion arising from the high negative charge on the proteins. When neutralization with acid occurs, this high negative charge is reduced and some of the subunits recombine to form aggregates, but most of the modified protein consists of molecules smaller than the starting material. When $NH_3$ modified protein is dried by spray drying directly from the alkaline state, less of the aggregated units are formed—i.e. with no acid neutralization step the molecules are dried from a state of high negative charge. In this state electrostatic repulsion between molecules is believed to prevent recombination of subunits and formation of higher molecular weight aggregates. The marked reduction in molecular size of the soy protein prepared by our process contributes to the excellent water solubility of the modified soy protein product.

As previously indicated, our invention also relates to heat coagulable compositions comprising egg white and the modified soy protein products and to the use of these compositions in the production of foods which are normally structured primarily by egg white alone through its heat coagulation properties. Such compositions comprise generally from 25 to 99% by weight egg white and 75 to 1% by weight of the modified soy protein product, the percentages being based on the dry weight or solids content of the egg white and the modified soy protein product. At the lower amounts of modified soy protein, there is but a moderate reduction in cost of the heat coagulable component of the foods whereas at the higher levels of modified soy protein the cost reduction is very substantial. Also, depending somewhat on the conditions and materials used in the preparation of the modified soy protein product, the compositions may have one or more properties which are not only reasonably equal to those of egg white alone but may be improved over those of the egg white. In this respect and as merely illustrative, the gel strengths of gels prepared from preferred 50:50 mixtures of egg white and the modified soy protein products generally exceed the gel strength of gels prepared from either of the components alone. The compositions may be in dried form or in the form of aqueous solutions. Such aqueous solutions may contain various concentrations of the egg white and modified soy protein product. It is often desirable and preferred that they have a solids content approximating that of fresh egg white.

Our invention also relates to the preparation of foods which utilize egg white for its structuring or heat coagulation properties. Up to ¾ of the normal level of egg white in such foods can be replaced by the modified soy protein. White layer cakes are advantageously prepared using the egg white-modified soy protein combination. In this instance, complete mixes are available to the housewife and to institutions and bakeries. Such mixes can be made up using dried egg whites and the dried modified soy protein products to effect substantial reductions in manufacturing costs while retaining product quality at a good level. The new meat analogs can also be prepared using the egg white-modified soy protein product composition as the primary binder for the spun edible protein fibers. In this instance, it may be desirable to use the modified soy protein product in its aqueous solution rather than to go through the dehydration and rehydration steps.

The invention will be further described and illustrated by the examples to follow which are not to be considered as limiting. In such examples gels are made from 20 gram portions of 10% by weight aqueous solutions of egg white, modified soy protein or combination of egg white and modified soy protein in 30 x 60 mm. standard taper 29/12 glass weighing bottles, covered with a vented cork, heated 30 minutes at 90° C. and cooled in a 30° C. bath for 30 minutes. The weight in grams to depress the ½ in. plunger of a Bloom Gelometer 4 mm. into the gel is recorded as the gel strength. For the shear press tests, a plug of the gel is removed from the weighing bottle with a #15 cork borer and sheared on an Allo Kramer shear press using a 100 lb. proving ring. Water binding is determined by centrifuging the heat coagulated gel for 15 minutes at 28,000×g in a conical graduated centrifuge tube. The percentage of the water retained by the gel is defined as the water binding capacity.

EXAMPLE I

An 8.3% by weight aqueous dispersion of a commercially available soy protein isolate (95.9% protein on a dry basis—alkaline extracted, HCl precipitated—Promine R) was continuously pumped into a high speed mixer where a caustic soda solution (5.4% by weight NaOH) was continuously added to yield a solution having an isolate solids to NaOH weight ratio of 11 to 1. The alkaline solution was maintained at 28° C. for 4 minutes followed by continuous neutralization with phosphoric acid (77.0% by weight in water) to a pH of 7.0 in a second mixer. The resulting neutral slurry was spray dried. Solutions were made up by dissolving: 10% by weight of the modified soy in water; 5% by weight of the modified soy and 5% of dehydrated egg white in water; and 10% by weight of dehydrated egg white in water. The solutions were coagulated in the manner set forth above. The resulting gels had gel strengths of 15 g., 243 g. and 185 g., respectively. In the water binding test, the gel or coagulum from the 10% egg white solution bound only 35% of the water whereas the coagulum from the 5% modified soy: 5% egg white solution bound 86% of the water. The data of this example thus shows that the combination of the modified soy and egg white yields results which are unexpected and better than egg white alone.

EXAMPLE II

A sodium hydroxide extracted and sulfurous acid precipitated soy isolate (95.0% protein on a dry basis) was dispersed in water at 17.5% solids and processed continuously as in Example I at a soy solids to sodium hydroxide weight ratio of 10.2 to 1. The dispersion also contained an amount of sodium tripolyphosphate equal to 1% by weight of the soy isolate solids. The resulting alkaline solution was maintained at 46° C. for 3.6 minutes before continuous neutralization to a pH of 7.1–7.3 with phosphoric acid as in Example I. The gel strength of a coagulum prepared from an aqueous solution of 5% by weight of the modified soy protein solids and 5% by weight of dried egg white was 240 g.

EXAMPLE III

A 13.2% by weight solids aqueous dispersion of a soy protein concentrate (73% protein on a dry basis) was continuously processed as in Example I at a soy solids to sodium hydroxide weight ratio of 14.3 to 1.0. The resulting alkaline dispersion was maintained at 37° C. for 4.2 minutes and then neutralized with the aqueous phosphoric acid to a pH of 7.1–7.2. The gel strength of a coagulum prepared from an aqueous solution of 5% by weight of the modified soy protein solids and 5% by weight dried egg white was 195 g.

EXAMPLE IV

Example I was repeated except that the dispersion contained 8.2% by weight of the isolate, the soy solids to sodium hydroxide weight ratio was 8.5 to 1 and the alkaline dispersion was held at 33° C. for 4 minutes prior to neutralization with phosphoric acid. A coagulum prepared from an aqueous solution of 5% by weight of the modified soy solids and 5% by weight dried egg white had a gel strength of 263 g. and required 3.7 lbs. to shear the gel or coagulum on the Allo Kramer shear press. A corresponding coagulum prepared from a 10% by weight egg white solution had a gel strength of 185 g. and a shear value of only 1.5 lbs.

EXAMPLE V

An 8% by weight aqueous dispersion of the soy isolate as used in Example II was adjusted to pH 11 with a caustic soda solution (50.0% by weight NaOH) at a soy solids to sodium hydroxide weight ratio of 18.6. The dispersion was heated to 60° C. for 15 minutes, then cooled to room temperature and neutralized with phosphoric acid as in Example II. A gel made from an aqueous solution containing 5% by weight of the modified soy solids and 5% by weight dried egg white had a gel strength of 249 g. For this particular system, the 60° C. treating temperature gives optimum results. Thus the gel strength of the coagulums increases considerably as the treating temperature is raised from 40° C. to 60° C. and then drops somewhat as the treating temperature is further increased from 60° C. to 90° C. However, by increasing the amount of sodium hydroxide to a soy solids to sodium hydroxide weight ratio of 8–11, the treating temperature can be lowered to 25° C. to obtain excellent gel formers. For a continuous high throughput, modification of the soy isolate is preferably carried out at 25° C. with the use of the increased amounts of sodium hydroxide.

EXAMPLE VI

An aqueous dispersion of 8% by weight of the soy isolate as used in Example II at 50° C. was sparged with ammonia gas for 1 hour with continuous stirring. After cooling to room temperature, 1 part of 30% $H_2O_2$ was added per 75 parts of solution and the resulting mixture dried by lyophilization. The resulting modified soy had a pH of 7.4. The gel strength of a coagulum prepared from a 5% by weight modified soy solids and 5% by weight dried egg white solution was 239 g.

EXAMPLE VII

Example VI was repeated except the dispersion was sparged with the ammonia gas for 15 minutes at 70° C. The resulting modified soy-egg white coagulum had a gel strength of 274° g.

EXAMPLE VIII

Meat analogs were prepared from the following ingredients:

| | Grams |
|---|---|
| Spun edible soy protein fibers [1] | 140 |
| Hydrogenated vegetable shortening | 29.8 |
| Vital gluten | 16.6 |
| Beef flavoring | 22.7 |
| Toasted soy protein | 13.5 |
| Water | 70 |

[1] Prepared as in Westeen et al. Pat. 3,118,959 and containing about 70% by weight moisture.

In the first sample, a serum was prepared from 17.3 g. dried egg white and all the ingredients except the fibers. The fibers (chopped to lengths of about 1–1½ inches) were then impregnated with the serum, cooked at a temperature of 212° F., cooled and passed through a meat grinder and dried. A second sample was prepared in the identical manner except that ½ of the dried egg white was replaced by an equal amount on a solids basis of the modified soy isolate product of Example V. A third sample was prepared except that only 8.65 g. of dried egg white was used. Upon rehydration the samples containing the normal egg white level and the combination of egg white and modified soy protein product were judged similar in texture and flavor and both resembled natural cooked hamburger to a high degree. The sample with ½ the normal egg white level and no modified soy protein did not hold together properly during grinding and gave a product that was judged to be too soft and mushy.

EXAMPLE IX

Meat analogs were prepared in a manner similar to Example VIII but with various flavors and from the ingredients as follows (percentages being by weight):

| Product | Flavoring | Fat | Egg white | Water | Spun soy protein fibers [1] |
|---|---|---|---|---|---|
| Beef granules | 17.3 (Beef) | 10.2 | 5.8 | 21.0 | 45.7 |
| Ham | 11.1 (Ham) | 11.6 | 3.9 | 18.7 | 54.7 |
| Chicken | 15.3 (Chicken) | 7.6 | 5.5 | 22.7 | 48.9 |

[1] As in Example VIII.

Analogs were also prepared wherein ½ of the dried egg white was replaced with an equal amount on a solids basis of the modified soy protein product prepared in Example II. The latter products were judged to be superior to the products with the normal egg white levels in the following characteristics: (a) more moist, (b) more tender, (c) required less chewing to swallow, (d) had improved processing characteristics—i.e. less separation of islands of coagulated material during processing and (e) toughened less during storage.

EXAMPLE X

A series of white layer cakes were prepared from the following formulation and variations thereof:

Ingredient: Percent by wt.
  Flour _____ 38.42
  Sugar _____ 42.01
  Hydrogenated vegetable shortening _____ 10.00
  Non-fat milk solids _____ 2.49
  Dextrose _____ 2.00
  Dehydrated egg white _____ 1.60
  Salt _____ 0.86
  Sodium aluminum phosphate _____ 0.82
  Sodium bicarbonate _____ 0.76
  Lecithin _____ 0.59
  Monocalcium phosphate monohydrate _____ 0.30
  Vanilla powder _____ 0.15

In the first variation, ½ of the dehydrated egg white was replaced with an equal amount of a solids basis of the modified soy protein as prepared in Example I. In the second variation, the dehydrated egg white content was merely reduced by ½ with no replacement. Cakes were prepared from the formulations by mixing 700 grams thereof with 385 cc. of water on a Hobart mixer at No. 2 speed for 5 minutes, followed by baking for 25–30 minutes at 350° F. The cakes prepared from the normal egg white level and the variation involving the use of the modified soy protein product were substantially equivalent in all respects. The cake having only ½ of the normal egg white level had a very weak unsatisfactory structure.

The embodiments of the invention in which an exclusive property or privilege is claimed are defined as follows:

1. A process for producing a water soluble, modified soy protein product useful as a partial replacement for egg white in the production of foods whose structures depend at least in part on the heat coagulation properties of the egg white, said process consisting essentially of: raising the pH of an aqueous dispersion of about 5 to 20% by weight of a soy protein material having a protein content of at least about 70% by weight on a dry weight basis to at least about 9.0 by the addition to said protein of an alkaline material and then reducing the pH to between 5.5 and 8.0 while dispersing any beads of precipitated proteins which forms thereby yielding a water soluble, modified soy protein product.

2. The process of claim 1 wherein the solution having a pH of 5.5 to 8.0 is dried to yield a dehydrated modified soy protein product.

3. The process of claim 1 wherein the soy protein material is a soy isolate having a protein content of over 90% by weight on a dry basis.

4. A process for producing a water soluble, modified soy protein product useful as a partial replacement for egg white in the production of foods whose structures depend at least in part on the heat coagulation properties of the egg white which comprises raising the pH of an aqueous dispersion of about 5 to 20% by weight of a soy protein material having a protein content of at least about 70% by weight on a dry weight basis to at least about 9.0 by the addition of sodium hydroxide at a soy solids to sodium hydroxide weight ratio of between 8 to 1 and 20 to 1, holding the alkaline dispersion at a temperature of about 25 to 85° C. for from about 2 minutes to 1 hour and then reducing the pH to between 5.5 and 8.0 by the addition of an edible acid.

5. The process of claim 4 wherein the dispersion is continuously mixed with the sodium hydroxide at a soy solids to sodium hydroxide weight ratio of between 8 to 1 and 14 to 1 and the resulting alkaline dispersion is held at a temperature of about 25 to 40° C. for about 2 to 12 minutes.

6. The process of claim 5 wherein the pH is reduced to about 7.0.

7. The process of claim 6 wherein the pH is reduced by the addition of phosphoric acid.

8. A process for producing a water soluble, modified soy protein product useful as a partial replacement for egg white in the production of foods whose structures depend at least in part on the heat coagulation properties of the egg white which comprises raising the pH of an aqueous dispersion of about 5 to 20% by weight of a soy protein material having a protein content of at least about 70% by weight on a dry weight basis to at least about 9.0 by sparging the dispersion with ammonia gas and then reducing the pH to between 5.5 and 8.0.

9. The process of claim 8 wherein the sparging is carried out for about 15 minutes to 2 hours while the dispersion temperature is maintained at about 25 to 85° C. and the pH of the resulting alkaline dispersion is reduced by drying the same.

10. The process of claim 9 wherein the sparging is carried out for about 15 minutes to 1 hour while the dispersion temperature is maintained at about 25° C., the resulting alkaline dispersion is held at about 25° C. for about 1 to 48 hours and the pH is reduced by lyophilizing the dispersion.

11. The process of claim 9 wherein the soy protein material is an alkaline extracted-acid precipitated soy isolated having a protein content of over 90% by weight.

12. The process of claim 11 wherein the soy protein material is a sodium hydroxide extracted-sulfurous acid precipitated soy isolate.

13. A heat coagulable composition for use in foods whose structures depend at least in part on the heat coagulation properties of egg white comprising 25 to 99% by weight egg white and 75 to 1% by weight of the modified soy protein product prepared by the process of claim 1, the percentages being based on the dry weight of the egg white and the modified soy protein product.

14. A heat coagulable composition for use in foods whose structures depend at least in part on the heat coagulation properties of egg white comprising modified soy protein and egg white in a weight ratio of between 2:1 and 1:10 said modified soy protein product being prepared by raising the pH of an aqueous dispersion of about 5 to 20% by weight of a soy protein material having a protein content of at least about 70% by weight on a dry weight basis to at least about 9.0 by the addition of an alkaline material and reducing the pH to between 5.5 and 8.0.

15. A composition according to claim 14 wherein the modified soy protein product and egg white are present in a weight ratio of about 1 to 1.

16. A composition according to claim 14 wherein both the egg white and the modified soy protein product are in dehydrated form.

References Cited
UNITED STATES PATENTS

| | | | |
|---|---|---|---|
| 2,243,868 | 6/1941 | Katzman | 99—92 |
| 2,728,759 | 12/1955 | Keil | 99—14X |
| 2,916,379 | 12/1959 | Finucane | 99—92 |
| 3,160,507 | 12/1964 | Finucane | 99—94 |
| 3,177,079 | 4/1965 | Kuramoto et al. | 99—17 |

RAYMOND N. JONES, Primary Examiner

U.S. Cl. X.R.

99—17, 92